(12) United States Patent
Wei et al.

(10) Patent No.: US 8,989,437 B2
(45) Date of Patent: Mar. 24, 2015

(54) SALIENT OBJECT DETECTION BY COMPOSITION

(75) Inventors: Yichen Wei, Beijing (CN); Jie Feng, Beijing (CN); Litian Tao, Beijing (CN); Jian Sun, Beijing (CN)

(73) Assignee: Microsoft Corporation, Redmond, WA (US)

( * ) Notice: Subject to any disclaimer, the term of this patent is extended or adjusted under 35 U.S.C. 154(b) by 668 days.

(21) Appl. No.: 13/108,953

(22) Filed: May 16, 2011

(65) Prior Publication Data

US 2012/0294476 A1 Nov. 22, 2012

(51) Int. Cl.
*G06K 9/00* (2006.01)
*G06K 9/32* (2006.01)
*G06T 7/00* (2006.01)

(52) U.S. Cl.
CPC ............ *G06K 9/3233* (2013.01); *G06T 7/0081* (2013.01); *G06T 2207/10004* (2013.01)
USPC ............ 382/103; 382/284; 382/171; 382/165

(58) Field of Classification Search
CPC .. G06K 9/3233; G06K 9/4638; G06T 7/0081; G06T 2207/10004; G06T 7/0083; G06T 7/0087; G06T 2207/10024; G06T 2207/20016
USPC ......... 382/103, 104, 284, 287, 224, 171, 173, 382/106, 165, 195, 197, 190; 348/221.12, 348/143, 169
See application file for complete search history.

(56) References Cited

U.S. PATENT DOCUMENTS

| | | | | |
|---|---|---|---|---|
| 6,020,972 | A * | 2/2000 | Mahoney et al. | 358/1.14 |
| 7,274,741 | B2 * | 9/2007 | Ma et al. | 375/240.08 |
| 7,274,832 | B2 | 9/2007 | Nicponski | |
| 7,577,684 | B2 * | 8/2009 | Rising | 1/1 |
| 7,636,454 | B2 | 12/2009 | Lee et al. | |
| 8,320,670 | B1 * | 11/2012 | Li et al. | 382/168 |
| 8,369,652 | B1 * | 2/2013 | Khosla et al. | 382/284 |
| 8,417,060 | B2 * | 4/2013 | Abousleman et al. | 382/284 |
| 2002/0061134 | A1 | 5/2002 | Cofer et al. | |
| 2002/0125435 | A1 | 9/2002 | Cofer et al. | |
| 2004/0088726 | A1 * | 5/2004 | Ma et al. | 725/46 |
| 2007/0086622 | A1 * | 4/2007 | Sun et al. | 382/103 |
| 2007/0286526 | A1 * | 12/2007 | Abousleman et al. | 382/284 |
| 2008/0193048 | A1 * | 8/2008 | Sun et al. | 382/284 |
| 2010/0215254 | A1 | 8/2010 | Prokhorov | |
| 2011/0229025 | A1 * | 9/2011 | Zhao et al. | 382/165 |
| 2012/0008836 | A1 * | 1/2012 | Bobbitt et al. | 382/113 |
| 2012/0020528 | A1 * | 1/2012 | Yamada | 382/106 |
| 2012/0271148 | A1 * | 10/2012 | Nelson | 600/411 |

(Continued)

OTHER PUBLICATIONS

Achnta et al, "Frequency-Tuned Salient Region Detection," IEEE International Conference on Computer Vision and Pattern Recognition (CVPR), Jun. 2009, 8 pgs.

(Continued)

*Primary Examiner* — Mekonen Bekele
(74) *Attorney, Agent, or Firm* — Dan Choi; Judy Yee; Micky Minhas

(57) ABSTRACT

A computing device configured to determine, for each of a plurality of locations in an image, a saliency measure based at least on a cost of composing parts of the image in the location from parts of the image outside of the location is described herein. The computing device is further configured to select one or more of the locations as representing salient objects of the image based at least on the saliency measures.

20 Claims, 4 Drawing Sheets

(56) References Cited

U.S. PATENT DOCUMENTS

| | | | |
|---|---|---|---|
| 2013/0223740 A1* | 8/2013 | Wang et al. | 382/171 |
| 2013/0268262 A1* | 10/2013 | Moilanen et al. | 704/9 |

OTHER PUBLICATIONS

Alexe et al, "What is an Object?" retrieved at <<http://www.vision.ee.ethz.ch/~calvin/Publications/alexe-cvpr10.pdf>>, 2010 IEEE Computer Society Conference on Computer Vision and Pattern Recognition, San Francisco, CA, Jun. 13-18, 2010, 8 pgs.

Bagon et al, "What is a Good Image Segment? A Unified Approach to Segment Extraction," Proceeding ECCV '08 Proceedings of the 10th European Conference on Computer Vision: Part IV, Oct. 2008, 14 pgs.

Bruce et al, "Saliency based on Information Maximization," Neural Information Processing Systems—NIPS, Dec. 2005, 8 pgs.

Butko et al, "Optimal Scanning for Faster Object Detection," In Proceedings CVPR, Jun. 2009, pp. 2751-2758.

Dalal et al, "Histograms of Oriented Gradients for Human Detection," Proceeding CVPR '05, Proceedings of the 2005 IEEE Computer Society Conference on Computer Vision and Pattern Recognition (CVPR'05), Jun. 2005, 8 pgs.

Deselaers et al, "Global and Efficient Self-Similarity for Object Classification and Detection," CVPR, Jun. 2010, 8 pgs.

Dollar et al, "Pedestrian Detection—A Benchmark," IEEE Conference on Computer Vision and Pattern Recognition, Jun. 2009, 8 pgs.

Elazary et al, "Interesting Objects are Visually Salient," retrieved at <<http://ilab.usc.edu/publications/doc/Elazary_Itti08jov.pdf>>, Journal of Vision (2008) 8(3):3, Mar. 7, 2008, pp. 1-15.

Endres et al, "Category Independent Object Proposals," retrieved at <<o:\docs\MS1\5143US\PH1126.PDF>>, Computer Science Department, University of Illinios at Urbana-Champaign, ECCV, Sep. 2010, pp. 1-14.

Everingham et al, "The Pascal Visual Object Classes (VOC) Challenge" available at <<http://homepages.inf.ed.ac.uk/ckiw/postscript/ijcv_voc09.pdf>>, International Journal of Computer Vision, Sep. 2009, pp. 1-34.

Felzenszwalb et al, "Efficient Graph-based Image Segmentation," International Journal of Computer Vision, Sep. 2004, pp. 1-26.

Gao et al, "The Discriminant Center-Surround Hypothesis for Bottom-Up Saliency," retrieved at <<http://books.nips.cc/papers/files/nips20/NIPS2007_0874.pdf>>, In Proceedings: NIPS, Dec. 2007, pp. 1-8.

Goferman et al, "Context-Aware Saliency Detection," CVPR, Jun. 2010, 8 pgs.

Harel et al, "Graph-Based Visual Saliency," retrieved at <<http://books.nips.cc/papers/files/nips19/NIPS2006_0897.pdf>>, Proceedings of NIPS'2006, Dec. 2006, 8 pgs.

Hou et al, "Saliency Detection: A Spectral Residual Approach," Conference on Computer Vision and Pattern Recognition (CVPR), Jun. 2007, 8 pgs.

Huang et al, "A Collaborative Benchmark for Region of Interest Detection Algorithms," Computer Vision and Pattern Recognition, (CVPR), Jun. 2009, 8 pgs.

Itti et al, "A Model of Saliency-Based Visual Attention for Rapid Scene Analysis," IEEE Transactions on Pattern Analysis and Machine Intelligence, vol. 20, No. 11, Nov. 1998, pp. 1254-1259.

Judd et al, "Learning to Predict Where Humans Look," 12th International Conference on Computer Vision (ICCV), Sep. 2009, pp. 2106-2113.

Kadir et al, "Saliency, Scale and Image Description," International Journal of Computer Vision, Nov. 2001, pp. 83-105.

Kim et al, "Unsupervised Detection of Regions of Interest Using Iterative Link Analysis," retrieved at <<http://www.cs.cmu.edu/~gunhee/publish/nips09_gunhee.pdf>>, NIPS, Dec. 2009, pp. 1-9.

Liu et al, "Learning to Detect a Salient Object," Computer Vision and Pattern Recognition (CVPR), Jun. 2007, 8 pgs.

Ma et al, "Contrast-based Image Attention Analysis by Using Fuzzy Growing," MM'03, Nov. 2-8, 2003, pp. 374-381.

Marchesotti et al, "A Framework for Visual Saliency Detection with Applications to Image Thumbnailing," 2009 IEEE 12th International Conference on Computer Vision (ICCV), Sep. 2009, pp. 2232-2239.

Navalpakkam et al, "An Integrated Model of Top-down and Bottom-up Attention for Optimizing Detection Speed," Conference on Computer Vision and Pattern Recognition (CVPR), Jun. 2006, 8 pgs.

Rahtu et al, "Segmenting Salient Objects from Images and Videos," retrieved at <<http://www.cs.cmu.edu/~yke/volumetric/iccv05-volumetric.pdf>>, ECCV'10 Proceedings of the 11th European conference on Computer vision: Part V, Sep. 2010, pp. 1-14.

Ramanathan et al, "An Eye Fixation Database for Saliency Detection in Images," The 11th European Conference on Computer Vision (ECCV), Sep. 2010, pp. 30-43.

Rubner et al, "The Earth Movers Distance as a Metric for Image Retrieval," International Journal of Computer Vision, (40)2, Nov. 2000, pp. 99-121.

Russakovsky et al, "A Steiner Tree Approach to Efficient Object Detection," Computer Vision and Pattern Recognition (CVPR), Jun. 13-18, 2010, 8 pgs.

Rutishauser et al, "Is Bottom-Up Attention Useful for Object Recognition?", Proc IEEE International Conference on Computer Vision and Pattern Recognition (CVPR), Jun. 2004, pp. 37-44.

Shechtman et al, "Matching Local Self-Similarities across Images and Videos," retrieved at <<http://www.wisdom.weizmann.ac.il/~vision/VideoAnalysis/Demos/SelfSimilarities/SelfSimilarities_ShechtmanIrani07.pdf>>, Computer Vision and Pattern Recognition, 2007, CVPR '07, IEEE Conference, Jun. 17-22, 2007, 8 pgs.

Simakov et al, "Summarizing Visual Data Using Bidirectional Similarity," retrieved at <<http://ieeexplore.ieee.org/stamp/stamp.jsp?tp=&arnumber=4587842>>, Computer Vision and Pattern Recognition, 2008, CVPR 2008, IEEE Conference, Jun. 23-28, 2008, 8 pgs.

Valenti et al, "Image Saliency by Isocentric Curvedness and Color," retrieved at <<http://www.science.uva.nl/research/publications/2009/ValentiICCV2009/ICCV_2009.pdf>>, IEEE International Conference on Computer Vision, Sep. 29-Oct. 2, 2009, 8 pgs.

Valenti et al, "Image Saliency by Isocentric Curvedness and Color," Computer Vision, 2009 IEEE 12th International Conference, (ICCV), Sep. 2009, 8 pgs.

Vedaldi et al, "Multiple Kernels for Object Detection," retrieved at <<http://www.vlfeat.org/~vedaldi/assets/pubs/vedaldi09multiple.pdf, Computer Vision, 2009 IEEE 12th International Conference, Sep. 29, 2009—Oct. 2, 2009, 8 pgs.

Viola et al, "Rapid Object Detection using a Boosted Cascade of Simple Features," Conference on Computer Vision and Pattern Recognition (CVPR), Dec. 2001, pp. 1-9.

Wei et al, "Efficient Histogram-Based Sliding Window," IEEE Conference on Computer Vision and Pattern Recognition (CVPR), Jun. 2010, 8 pgs.

* cited by examiner

SALIENT OBJECT DETECTION BY COMPOSITION

BACKGROUND

Understanding images is often easy for people, but difficult for computers. A person may view a sequence of images and quickly recognize important objects in those images and relations of those objects to each other and of the images to each other. To a computer, the image is a set of data points denominated as "pixels" that are associated with values such as coordinates defining their locations and color values, often defined used a "red-green-blue" (RGB) color scheme. The computer attempts to understand the image by comparing the pixels in an image to each other or to pixels of other images. For example, if a set of pixels from another image has previously been labeled as a cat, the computer may recognize an association between that set of pixels and pixels depicted in an image that the computer is analyzing. Based on the association, the computer determines that the analyzed image includes a cat.

To understand an image without reference to other images, a computer may generate a saliency map by measuring the visual importance of the pixels comprising the image. Further analysis of the saliency map is then performed to extract a salient object from the image. Salient objects may include parts of the image that are to some degree distinct from other parts of the image. For example, in a picture of a cat sitting on a table, the cat and possibly the table may be recognized by a computer as salient objects. The use of saliency maps for images with complex objects or complex backgrounds, however, is often a difficult and ineffective way of locating salient objects. Also, the transformation of the image to a saliency map often causes image information to be lost and unavailable for salient object detection.

SUMMARY

To find the salient objects in an image, a computing device may determine costs of composing a plurality of image locations from parts of the image outside of those locations. The computing device may then identify one or more of these locations as salient objects based at least on the costs. In some embodiments, the image locations may be defined by a sliding window that is moved across the image. As the window is moved, the composition costs may be calculated at each location. Also, the image may be segmented into parts, and the composition cost may reflect the cost of composing the parts in the location from parts outside the location. Further, the composition cost may be based on one or both of an appearance distance or a spatial distance of parts in the location from parts outside the location.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

This application describes techniques for finding the salient objects in an image. To find the salient objects, a computing device determines saliency measures for locations in the image based on costs of composing the locations from parts of the image outside of those locations. The computing device then selects one or more of the locations as salient objects based on the saliency measures. For example, locations that are local maxima may be selected as salient objects. As used herein, the term "salient object" refers to an image location that is distinct to a certain extent from the rest of the image, which what is considered "distinct" varying from embodiment to embodiment.

In various embodiments, the computing device may segment the image into a plurality of parts. In calculating the cost of composing an image location, the computing device may calculate the cost of composing the parts of the image in the location from the parts of the image outside of the location. Any parts that intersect a location boundary may then be classified as the parts in the location or the parts outside of the location based on the relative sizes of the portions of each such part in the location and outside of the location.

In some embodiments, the image locations may be defined by a sliding window that is moved across the image, the sliding window defining the locations as it is moved. Further, the computing device may utilize a plurality of windows of different shapes and sizes and may process these windows in parallel, calculating saliency scores for multiple locations defined by multiple windows in a same time period. In one embodiment, the computing device may utilize a plurality of window shapes and a plurality of sizes of each shape.

In various embodiments, the computing device performs the determining of the saliency measure for a location based at least on appearance distances and spatial distances of the parts of the image in the location from the parts of the image outside the location. The computing device may also calculate the composition costs efficiently by using a number of techniques. First the computing device may use the parts of the image outside of the location only once in composing the parts of the image in the location. Second, the computing device may process parts of the image in the location that are further from a center of the location before those closer to the center of the location. Third, the computing device may first use parts of the image outside of the location with lowest composition costs relative to parts of the image in the location. After determining the saliency measure, the computing device may normalize that saliency measure based on the sizes of the location before using the saliency measure to select locations as salient objects.

Example Environment

Figure 1:
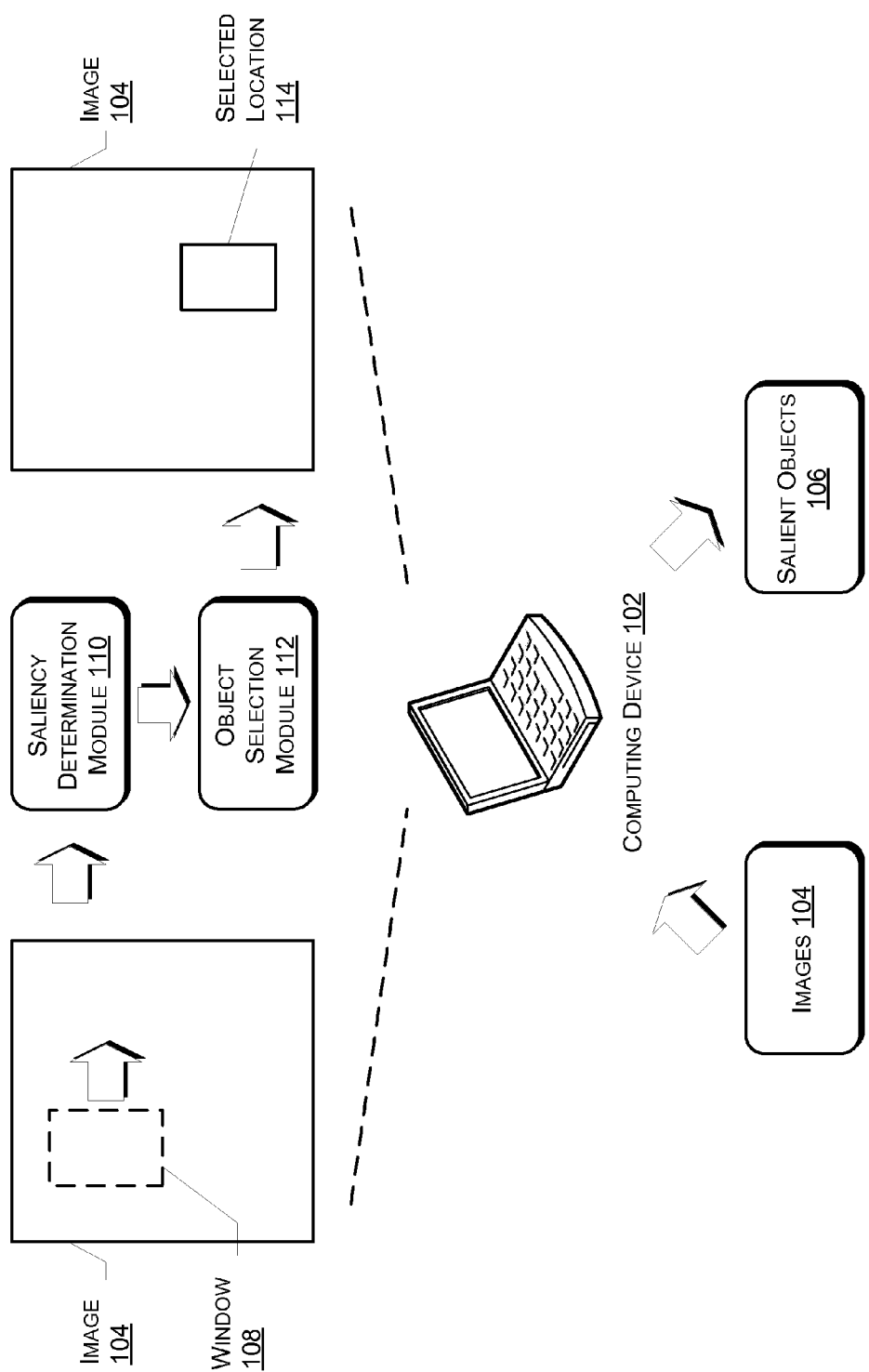
FIG. 1 illustrates an example environment, in accordance with various embodiments.

FIG. 1 illustrates an example environment, in accordance with various embodiments. As shown in FIG. 1, a computing device 102 may receive one or more images 104 and may determine one or more salient objects 106 in each image 104. To determine the salient objects 106, the computing device 102 may utilize one or more sliding windows 108 which are moved across each image 104. A saliency determination module 110 of the computing device 102 may then determine saliency scores for locations in the image 104 defined by the sliding window 108 based at least on costs of composing the locations from parts of the image 104 outside the locations. Based at least on the saliency scores, an object selection module 112 of the computing device 102 then selects one or more locations 114 as salient objects 106.

Figure 3:
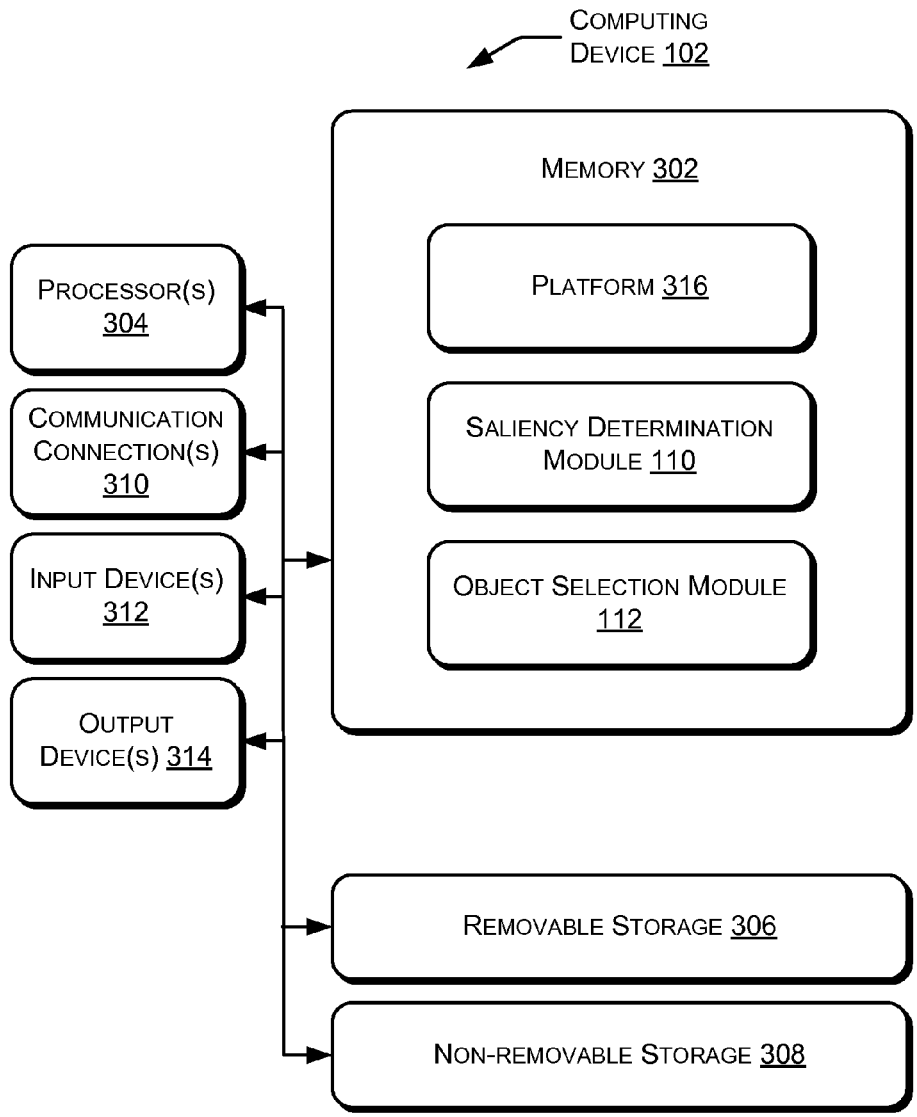
FIG. 3 is a block diagram of an example computer system architecture, in accordance with various embodiments.

In various embodiments, the computing device 102 may be any sort of computing device or computing devices. For example, the computing device 102 may be or include a personal computer (PC), a laptop computer, a server or server farm, a mainframe, a tablet computer, a work station, a telecommunication device, a personal digital assistant (PDA), a media player, a media center device, a personal video recorder (PVR), a television, or any other sort of device or devices. In one implementation, the computing device 102 represents a plurality of computing devices working in communication, such as a cloud computing network of nodes. When implemented on multiple computing devices (e.g., in a cloud computing system, etc.), the computing device 102 may distribute the modules 110 and 112 among the multiple devices. In some implementations, the computing device 102 represents one or more virtual machines implemented on one or more computing devices. The nature and functions of the modules 110 and 112 are described further herein. An example computing device 102 is illustrated in FIG. 3 and is described below in greater detail with reference to that figure.

In some implementations, a network or networks may connect multiple devices represented by the computing device 102, as mentioned above. Also, such a network or networks may connect the computing device 102 to other devices, such as devices providing images 104 or devices using the salient objects 106. The network or networks may be any type of networks, such as wide area networks (WANs), local area networks (LANs), or the Internet. Also, the network or networks may be public, private, or include both public and private networks. Further, the network or networks may be wired, wireless, or include both wired and wireless networks. The network or networks may utilize any one or more protocols for communication, such as the Internet Protocol (IP), other packet based protocols, or other protocols. Additionally, the network or networks may comprise any number of intermediary devices, such as routers, base stations, access points, firewalls, or gateway devices.

As illustrated in FIG. 1 and mentioned above, the computing device 102 may receive one or more images 104. The images 104 may be received from other computing devices or from a local process or storage of the computing device 102. The images 104 may be any sort of images, such as two-dimensional or three-dimensional images, RGB images or gray-scale images. The images 104 may also be of varying shapes and sizes, ranging, for example, from small thumbnails to very high resolution, detailed images. Further, the images 104 may include images of any of a number of formats, such as the Windows® bitmap (BMP), the graphic interchange format (GIF), the joint photographic experts groups (JPEG) format, the tagged image file format (TIFF), other Raster formats, vector formats, or stereo formats. Also, images 104 may include still images captured, for example, by a camera or image frames from one or more videos.

In various embodiments, the computing device 102 may segment the received images 104. The segmenting may be performed by either of modules 110 or 112 or by another modules of the computing device 102. In one embodiment, one or more of the images 104 may be segmented prior to its reception by the computing device 102. The segmentation may be performed using a graph-based algorithm to obtain a segmentation that better separates objects in the images 104 from the backgrounds of those images 104. For example, the segmentation may be performed using the algorithm described in P. F. Felzenszwalb and D. P. Huttenlocher, *Efficient Graph-based Image Segmentation, IJCV,* 59(2), 2004 and fixed parameters such as $\sigma=0.5$ and $K=250$. For each window location 108, the intersection area of an image segment and the window needs to be computed for window composition. Such area computation can be performed in a brute force manner or using an incremental computing algorithm that treats each segment as a histogram bin, such as the incremental computing algorithm described in Y. Wei and L. Tao, Efficient Histogram-Based Sliding Window, CVPR, 2010.

Figure 2:
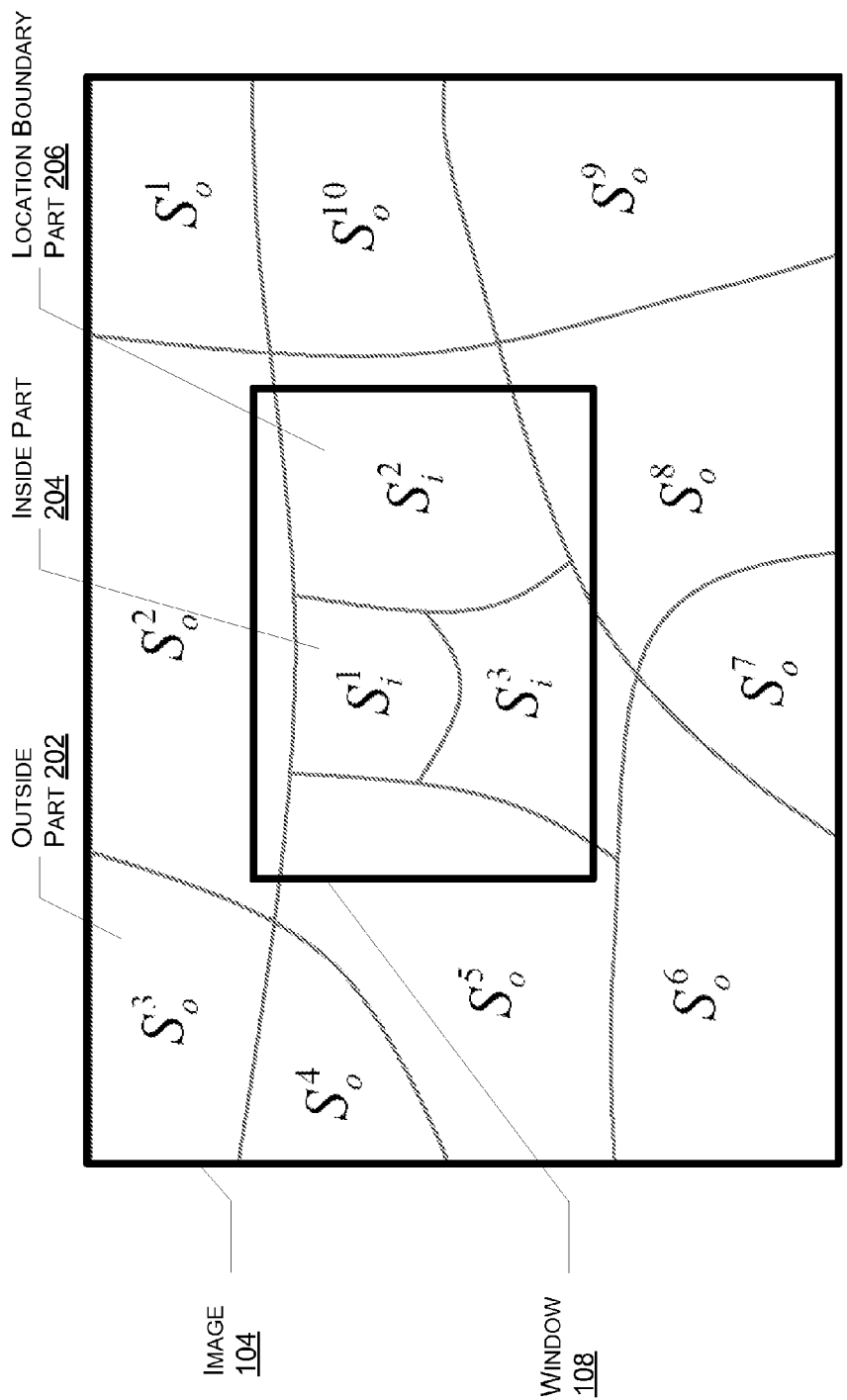
FIG. 2 shows an example segmented image and sliding window, in accordance with various embodiments.

The segmented image 104 is illustrated in FIG. 2. As shown in that figure, the image 104 may be segmented into a plurality of parts 202-206, which include an outside part 202, an inside part 204, and a location boundary part 206. These parts 202-206 may also be referred to herein as "segments", the terms "part" and "segment" being used interchangeably. As shown in FIG. 2, these parts 202-206 may be classified based on their relation to the sliding window 108 that is moved across the image 104. Because the sliding window 108 is moved across the image 104, a single one of the parts 202-206 may be classified as the outside part 202 at a first sliding window location, the inside part 204 at a second sliding window location, and the location boundary part 206 at a third sliding window location. The outside part 202 is a part of the image 104 that is entirely outside of a current location of the sliding window 108. The inside part 204 is a part of the image 104 that is entirely within the current location of the sliding window 108. The location boundary part 206 is a part of the image 104 that intersects with a boundary of the sliding window 108 at its current location.

In various embodiments, the computing device 102 may process each segmented image 104 by moving one or more sliding windows 108 across the segmented image 104. The sliding windows 108 may have any shape. For example, a plurality of different rectangular shapes may be used for the sliding windows 108. Also, a plurality of different sizes may used for the sliding windows 108. For example, the computing device 102 may utilize six different rectangular shapes and seven sizes for each shape, which makes forty-two different sliding windows 108. The computing device 102 may utilize each sliding window 108 in parallel with respect to other sliding windows. Upon selecting a sliding window 108, the computing device 102 may move the sliding window 108 across the segmented image 104. Each movement may be in a single direction (e.g., left, right, up, down) and may be a shift of N pixels (e.g., one pixel to the right, 10 pixels to the right, etc.). In one embodiment, the magnitude of N may vary based on the size of the image 104. Each movement is from one location in the image 104 to another location. At each location defined by the sliding window 108, the computing device 102 may classify parts of the image 104 based on their relation to that location, may extend regions at image boundaries, may determine the cost of composing parts of the image 104 in the location (i.e., the inside parts 204) from parts of the image 104 outside of the location (i.e., the outside parts 202), and may determine a saliency measure based on the composition cost.

In some embodiments, the computing device 102 classifies parts of the image 104 based on their relation to a current location of the sliding window 108. Parts of the image 104 that are entirely outside of the location are classified as the outside parts 202. Parts of the image 104 that are entirely inside the location are classified as the inside parts 204. The location boundary parts 206, which are part of the image 104 that intersect with the current location/sliding window 108 boundary such that a first portion of each location boundary part 206 is inside the location and a second portion of the location boundary part 206 is outside of the location, may be classified as the outside parts 202 or the inside parts 204. To classify the location boundary parts 206, the computing device 102 compares the relative sizes of the first and second portions. If the first portion is larger, the location boundary part 206 is classified as the inside part 204. If the second portion is larger, the location boundary part 206 is classified as the outside part 202. The classifying may be performed by either of modules 110 or 112 of the computing device 102 or by another module or modules of the computing device 102.

Also, in some embodiments, the computing device 102 may extend regions adjacent to a boundary of the image 104 and utilize the extended portion of the regions as an outside part or parts 202 for the purposes of composing inside parts 204. Background areas chopped by an image boundary may be falsely recognized as salient objects 104 because portions of those areas are outside of the image 104, causing the cost of composing the chopped background areas to be higher. This false recognition is overcome by extending regions at the image boundary and using the extended regions to compose the inside part 204. In such embodiment, the computing device 102 extends the regions by a factor α, α being the ratio between the number of boundary pixels and the perimeter of the part comprising the region.

In various embodiments, the saliency determination module 110 of the computing device 102 then determines the cost of composing the inside parts 204 from the outside parts 202. That cost may be defined as:

$$c(s_i, s_o) = [1 - d_s(s_i, s_o)] * d_a(s_i, s_o) + d_s(s_i, s_o) * d_a^{max}$$

where $s_i$ is an inside part 204 and $s_o$ is an outside part 202. Each part $s_i$, $s_o$ comprises a set of unordered pixels belonging to that part. Referring again to the cost definition $c(s_i, s_o)$, $d_s(s_i, s_o)$ is the spatial distance of $s_i$ from $s_o$, $d_a(s_i, s_o)$ is the appearance distance of $s_i$ from $s_o$, and $d_a^{max}$ is the appearance distance of the two most dissimilar parts of the image. Thus, the composing cost $c(s_i, s_o)$ is a linear combination of the appearance distance and maximum appearance distance, weighted by the spatial distance. It is monotonically increasing with respect to $d_a$ and $d_s$, and small when $s_o$ is similar and near to $s_i$. In some embodiments, $d_a$ is the intersection distance of quantitized LAB color histograms of $s_i$ and $s_o$, and $d_s$ is the Hausdorff distance between $s_i$ and $s_o$, normalized by the longer dimension of image 104 and clipped to [0,1]. Pairwise distances between two parts/segments may only be calculated once.

To reduce the complexity of determining the composition cost, the saliency determination module 110 may utilize a greedy optimization algorithm that may have a number of features. First, in composing the inside parts 204, each outside part 202 may only be used once. Second, since the outside parts 202 may not be reused, the algorithm may empirically order the inside parts 204 such that inside parts that are easier to compose are processed first to minimize the total cost. In one embodiment, the algorithm assumes that the center of the current location/sliding window 108 is more likely to be a salient object and thus more likely to have a higher composition cost. Based on this assumption, the algorithm may order the inside parts 204 from furthest to the center to closest to the center and begin processing the further of the inside parts 204 from the center first. Third, for each inside part 204 currently being processed, the algorithm attempts to use unused ones of the outside parts 202 with the smallest composition cost first. In order to process the inside parts 204 in the manner, the algorithm may, in a pre-processing stage, determine a sorted list $L_k$ for each part k of the image 104, the list $L_k$ listing all other parts of the image in ascending order of composition cost with respect to part k. Thus, the part of the image with the smallest composition cost with respect to part k would be listed first. When processing each inside part 204, its associated list $L_k$ is used to identify the highest ranked one of the outside parts 202 that remains unused. The algorithm then uses that identified outside part 202 to compose the inside part 204. Also, in some embodiments, when there are no unused outside parts 202 left that are capable of composing an inside part 204, that inside part is assigned $d_a^{max}$ as its composition cost.

In various embodiments, once each inside part 204 has been processed, the saliency determination module 110 may sum the composition costs for the inside parts 204 to determine the cost of composing the current location/sliding window 108. This summed cost may then be used as the saliency measure for that location. In some embodiments, that saliency measure may then be normalized based on the size of the location/sliding window 108 to prevent a bias towards recognizing larger locations/sliding windows 108 as salient objects 106.

Once the saliency determination module 110 has determined saliency measures for each location using the one or more sliding windows 108, the object selection module 112 may select one or more locations 114 as salient objects 106 based at least on the saliency scores. In some embodiments, this may involve the object selection module 112 selecting locations 114 that are local maxima. The object selection module 112 may determine which locations are local maxima by removing any locations that significantly overlap with other locations that have higher saliency measures. The remaining locations are selected as the locally maximal location 104.

In various embodiments, once the computing device 102 has selected locations 114 as the salient objects 106, those locations 114/salient objects 106 may be utilized in a number of ways by the computing device 102 or by other devices. For example, the locations 114/salient objects 106 may be utilized as image thumbnails, for image retargeting, or for image summarization.

Example System Architecture

FIG. 3 is a block diagram of an example computer system architecture for computing device 102, in accordance with various embodiments. As shown, the computing device 102 may comprise at least a memory 302 (including a cache memory) and one or more processing units (or processor(s)) 304. The processor(s) 304 may be implemented as appropriate in hardware, software, firmware, or combinations thereof. Software or firmware implementations of the processor(s) 304 may include computer-executable or machine-executable instructions written in any suitable programming language to perform the various functions described. Processor(s) 304 may also or alternatively include one or more graphic processing units (GPUs).

Memory 302 may store program instructions that are loadable and executable on the processor(s) 304, as well as data generated during the execution of these programs. Depending on the configuration and type of computing device, memory 302 may be volatile (such as random access memory (RAM)) and/or non-volatile (such as read-only memory (ROM), flash memory, etc.). The computing device or server may also include additional removable storage 306 and/or non-removable storage 308 including, but not limited to, magnetic storage, optical disks, and/or tape storage. The disk drives and their associated computer-readable media may provide non-volatile storage of computer readable instructions, data structures, program modules, and other data for the computing devices. In some implementations, the memory 302 may include multiple different types of memory, such as static random access memory (SRAM), dynamic random access memory (DRAM), or ROM.

Computer-readable media includes, at least, two types of computer-readable media, namely computer storage media and communications media.

Computer storage media includes volatile and non-volatile, removable and non-removable media implemented in any method or technology for storage of information such as computer readable instructions, data structures, program modules, or other data. Computer storage media includes, but is not limited to, RAM, ROM, erasable programmable read-only memory (EEPROM), flash memory or other memory technology, compact disc read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave, or other transmission mechanism. As defined herein, computer storage media does not include communication media.

The computing device 102 may also contain communications connection(s) 310 that allow the computing environment 300 to communicate with a stored database, another computing device or server, user terminals, and/or other devices on a network. The computing device 102 may also include input device(s) 312, such as a keyboard, mouse, pen, voice input device, touch input device, etc., and output device (s) 314, such as a display, speakers, printer, etc.

Turning to the contents of the memory 302 in more detail, the memory 302 may include platform 316. The platform 316 may comprise an operating system and/or one or more application programs or services. The memory 302 may also include the saliency determination module 110 and the object selection module 112, which may each represent any one or more modules, applications, processes, threads, or functions. Both the saliency determination module 110 and the object selection module 112 are described above in greater detail. The memory 302 may further store data associated with and used by the saliency determination module 110 and the object selection module 112, as well as modules for segmenting the image 104, and for performing other operations.

Example Operations

Figure 4:
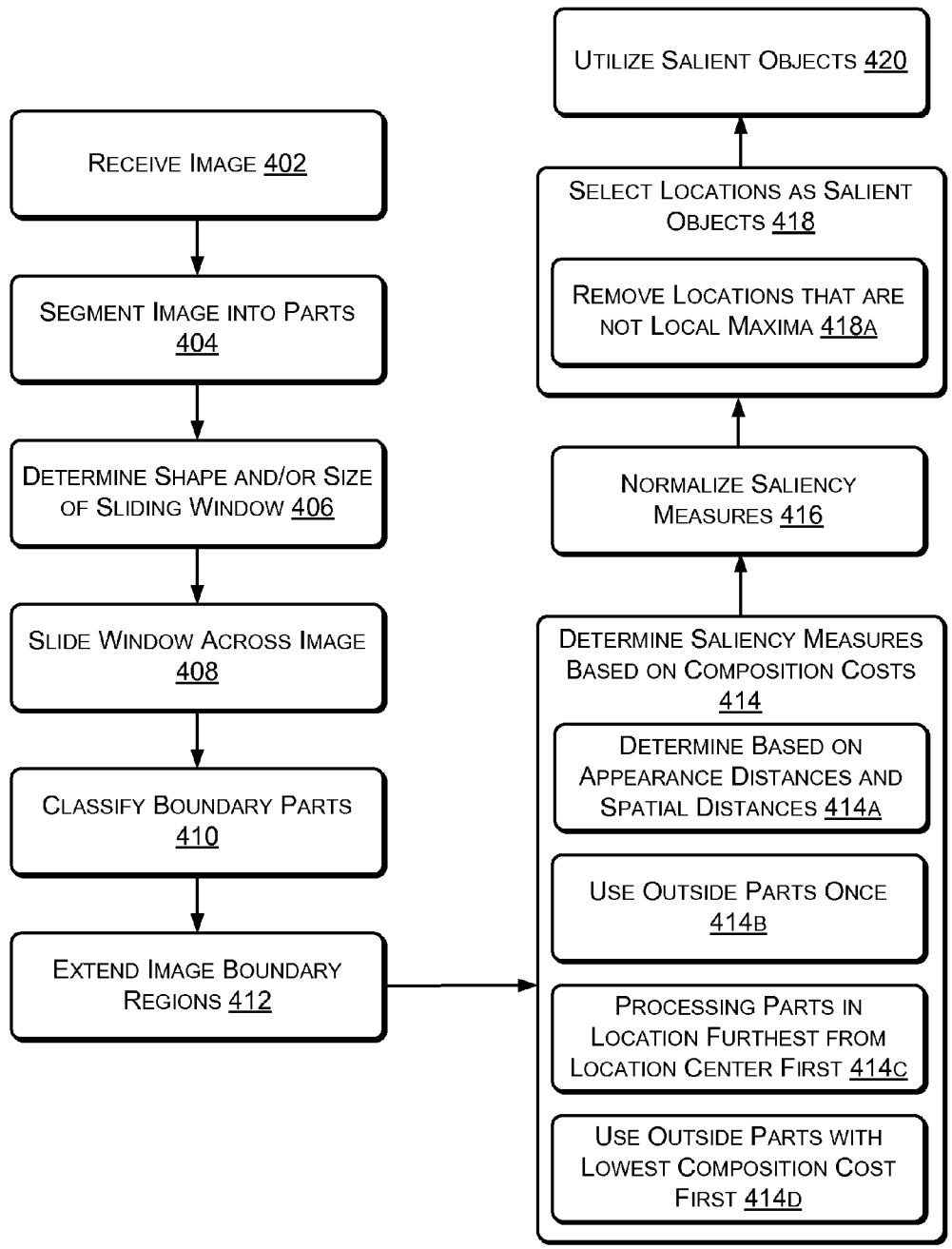
FIG. 4 is a flowchart showing a process of selecting locations in an image as salient objects based on a determination for each location of the cost of composing parts of the image in the location from parts of the image outside of the location, in accordance with various embodiments.

FIG. 4 is a flowchart showing a process of selecting locations in an image as salient objects based on a determination for each location of the cost of composing parts of the image inside of the location from parts of the image outside of the location, in accordance with various embodiments. The operations of the process are illustrated in individual blocks and summarized with reference to those blocks. This process is illustrated as a logical flow graph, each operation of which may represent a set of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

As illustrated at block 402, a computing device may receive one or more images. Such images may be stored locally or received from one or more remote devices. Upon receiving the images or at some later time, the computing device may segment, at block 404, each image into a plurality of parts. As mentioned above, the segmentation algorithms and resulting segmentations of the images may vary from embodiment to embodiment.

At block 406, the computing device may determine the shape or size of a sliding window. In some embodiments, the computing device determines a plurality of sliding window shapes and a plurality of sizes for each shape. Each sliding window may then be utilized in parallel. At block 408, each determined sliding window is moved across the image such that every location within the image or some sub-set thereof is included in the sliding window in at least one position of the sliding window.

The current position of the sliding window defines a location in the image, with some segments/parts of the image being in the location/window, others being outside the location/window, and others intersecting with the location/window boundary such that a first portion of such a segment/part is in the location/window and a second portion of the segment/part is outside the location/window. At block 410, the computing device may then classify these segments/parts that intersect with the location/window boundary as segments/parts in the location or segments/parts outside of the location based on relative sizes of the first and second portions of the segments/parts.

At block 412, the computing device may extend regions adjacent to a boundary of the image and utilize the extended portion of the regions as a part or parts of the image outside of the location for the purposes of composing parts of the image inside the location. As discussed above, background areas chopped by an image boundary may be falsely recognized as salient objects because portions of those areas are outside of the image, causing the cost of composing the chopped background areas to be higher. This false recognition is overcome by extending regions at the image boundary and using the extended regions to compose the parts inside locations/windows.

At block 414, the computing device may determine, for each of the plurality of locations in each image, a saliency measure based at least on a cost of composing the segments/parts in the location from segments/parts outside of the location. In some implementations, at block 414a, determining the cost is based at least on appearance distances and spatial distances of the segments/parts in the location from the segments/parts outside the location. In additional or alternative embodiments, at block 414b, the segments/parts outside of the location are each used only once in composing the segments/parts in the location. In further or alternative embodiments, at block 414c, the composing comprises processing segments/parts in the location that are further from center of the location before those closer to a center of the location. In additional or alternative embodiments, at block 414*d*, the composing comprises using segments/parts outside of the location with lowest composition costs relative to segments/parts of the image in the location first.

At block 416, the computing device may normalize the saliency measures based on location/window sizes to avoid a bias towards selecting larger location/windows as salient objects.

At block 418, the computing device may select for each image one or more of the locations as representing salient objects of the image based at least on the saliency measures. In some embodiments, at block 418*a*, the selecting involves removing locations that are not local maxima by removing locations that overlap (e.g., locations that overlap significantly; the amount of such significance may be a user specified parameter) with other locations, the other locations having higher saliency scores than the removed locations.

At block 420, the computing device may then utilize the salient objects as image thumbnails, for image retargeting, for image summarization, or for other object recognition tasks.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

We claim:

1. A method comprising:
   determining, by a computing device, for each of a plurality of locations in an image, a saliency measure based at least on a cost of composing parts of the image in the location from parts of the image outside of the location, the cost being determined based at least in part on appearance distances and spatial distances of the parts of the image in the location from the parts of the image outside the location; and
   selecting, by the computing device, one or more of the locations as representing salient objects of the image based at least on the saliency measures.

2. The method of claim 1, wherein the locations are defined by a sliding window that is moved across the image.

3. The method of claim 1, further comprising segmenting the image into a plurality of parts that include the parts in the location and the parts outside of the location.

4. The method of claim 1, wherein at least one part of the image intersects with a boundary of the location such that a first portion of the at least one part is in the location and a second portion of the at least one part is outside of the location.

5. The method of claim 4, further comprising classifying the at least one part as one of the parts in the location or one of the parts outside of the location based on relative sizes of the first and second portions of the at least one part.

6. The method of claim 1, further comprising determining the cost based at least on appearance distances and spatial distances of the parts of the image in the location from the parts of the image outside of the location.

7. The method of claim 1, wherein the parts of the image outside of the location are each used only once in composing the parts of the image in the location.

8. The method of claim 1, further comprising normalizing the saliency measures based on location sizes.

9. The method of claim 1, wherein the composing comprises processing parts of the image in the location that are further from center of the location before those closer to center of the location.

10. The method of claim 1, wherein the composing comprises using parts of the image outside of the location with lowest composition costs relative to parts of the image in the location first.

11. The method of claim 1, wherein selecting the one or more locations comprises selecting locations that are local maxima.

12. The method of claim 11, wherein selecting locations that are local maxima comprises removing locations that overlap with other locations, the other locations having higher saliency scores than the removed locations.

13. The method of claim 1, wherein the determining is performed in parallel for the plurality of locations.

14. The method of claim 1, further comprising extending regions adjacent to a boundary of the image and utilizing an extended portion of the regions as a part or parts of the image outside of the location.

15. The method of claim 1, further comprising utilizing the salient objects as image thumbnails, for image retargeting, or for image summarization.

16. One or more computer-readable storage devices comprising computer-executable instructions for programming one or more computing devices to perform operations comprising:
   for each of a plurality of locations in an image, determining a saliency measure based at least on a cost of composing parts of the image in the location from parts of the image outside of the location, the cost being determined based at least on appearance distances and spatial distances of the parts of the image in the location from the parts of the image outside the location; and
   selecting one or more of the locations as representing salient objects of the image based at least on the saliency measures.

17. The one or more computer-readable storage devices of claim 16, wherein the cost is based at least in part on a spatial distance between of a part of the image in the location and a part of the image outside the location.

18. The one or more computer-readable storage devices of claim 16, wherein the appearance distances are based on color histograms of parts of the image and the spatial distances are Hausdorff distances between parts of the image.

19. A system comprising:
   a processor;
   a saliency determination module configured to be operated by the processor to determine, for each of a plurality of locations in an image, a saliency measure based at least on a cost of composing parts of the image in the location from parts of the image outside of the location, the cost being determined based at least in part on spatial distances of the parts of the image in the location from the parts of the image outside the location, wherein determining the cost includes extending, by the processor, regions adjacent to a boundary of the image and utilizing the extended regions as the parts of the image outside of the location; and
   an object selection module configured to be operated by the processor to select one or more of the locations as representing salient objects of the image based at least on the saliency measures.

20. The system of claim 19, wherein each location being defined by a sliding window that is moved across the image and a plurality of sliding windows of different shapes and dimensions are used to define the plurality of locations.

* * * * *